United States Patent [19]
Simpson

[11] 4,406,848
[45] Sep. 27, 1983

[54] METHOD AND APPARATUS FOR MOLDING PLASTIC WINDOW SILLS

[76] Inventor: Norbert E. Simpson, 9650 Poundstone Pl., Englewood, Colo. 80111

[21] Appl. No.: 273,056

[22] Filed: Jun. 12, 1981

[51] Int. Cl.³ .......................... B29C 17/12; B29C 5/00
[52] U.S. Cl. ...................................... 264/161; 52/204; 249/141; 249/172; 425/812
[58] Field of Search ................ 264/161, 331; 249/172, 249/141; 52/204; 425/812

[56] References Cited

U.S. PATENT DOCUMENTS

| 833,701 | 10/1906 | Strait et al. | 249/172 X |
| 941,287 | 11/1909 | Sullivan | 249/172 X |
| 942,092 | 12/1909 | May | 249/172 X |
| 1,315,112 | 9/1919 | Gey, Jr. | 249/172 |
| 1,516,535 | 11/1924 | Johnson | 249/172 X |
| 3,087,207 | 4/1963 | Styra | 52/204 X |
| 3,800,015 | 5/1974 | Sachs | 249/172 X |
| 3,846,525 | 11/1974 | Kinne et al. | 249/172 X |
| 4,289,293 | 9/1981 | Cashion | 249/161 X |

FOREIGN PATENT DOCUMENTS 280805 12/1970 U.S.S.R. .......................... 249/172

Primary Examiner—Philip E. Anderson
Attorney, Agent, or Firm—Edwin L. Spangler, Jr.

[57] ABSTRACT

This invention relates to a pouring form for molded window sills characterized by a rigid frame having a generally J-shaped cross section defined by an upstanding flange, a base member depending from the lower margin of the upstanding flange and an upturned flange depending from the remote margin of the base member cooperating therewith and with the upstanding flange to produce an upwardly-opening channel; a first generally L-shaped insert having an upstanding flange paralleling the corresponding flange of the frame adapted to rest thereagainst in supporting relation thereto and a shaped flange depending from the lower margin of the upstanding flange bridging the gap between the latter and the upturned flange of the frame so as to cover the channel; a second generally L-shaped insert having upstanding and horizontal flanges; a pair of shaped plug-forming spacers adjustably positionable in longitudinally-spaced relation cooperating with the first and second inserts when placed therebetween to create a generally L-shaped cavity at both ends having an opening at the top defined by a space between the upstanding insert flanges and air vents along the edge remote from the upstanding flanges for the escape of air forced therefrom; and means carried by the frame for releasably retaining the inserts and plugs in assembled relation therein. The invention also encompasses the novel method of using the pouring form which comprises injecting a hardenable plastic under pressure into the opening in the top of the form while in the fluid state, sweeping the air trapped ahead of the plastic thus injected out through the air vents in the remote edge of the mold cavity so as to leave essentially no air bubbles or voids in the molded article filling the cavity; trimming the edge of the molded article along the opening where the plastic is introduced before it hardens, and removing the molded article from the mold after it hardens.

8 Claims, 9 Drawing Figures

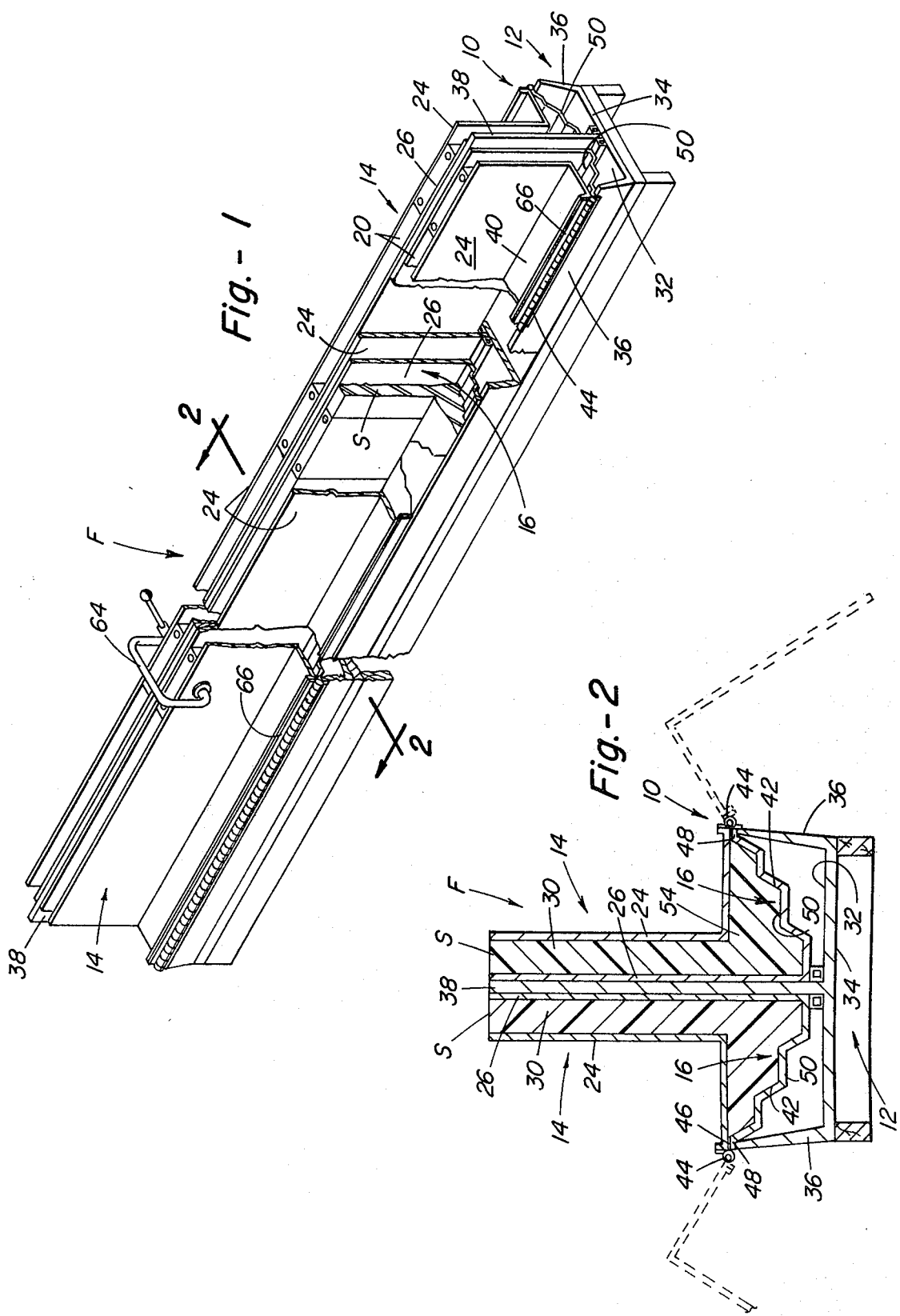

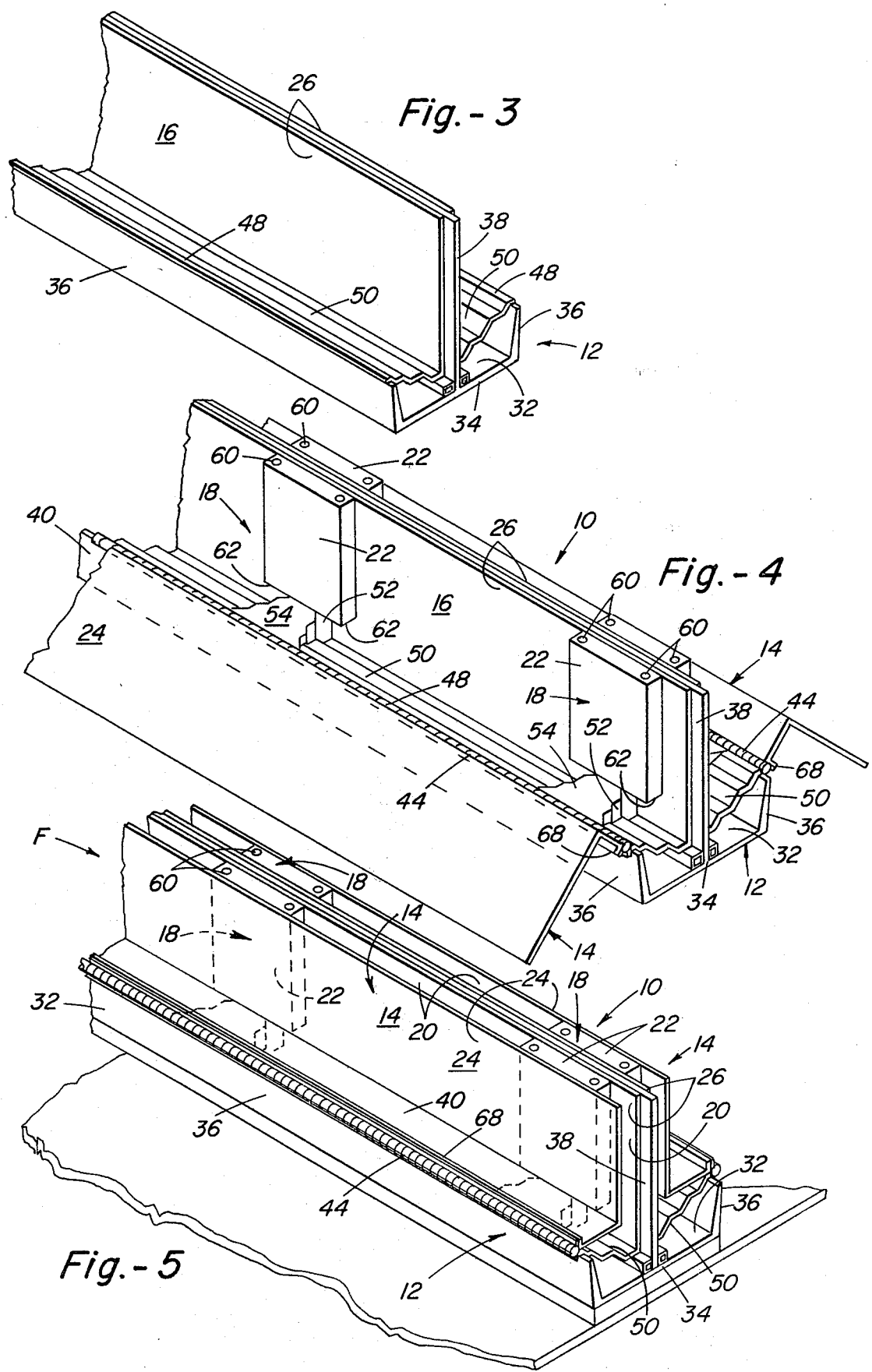

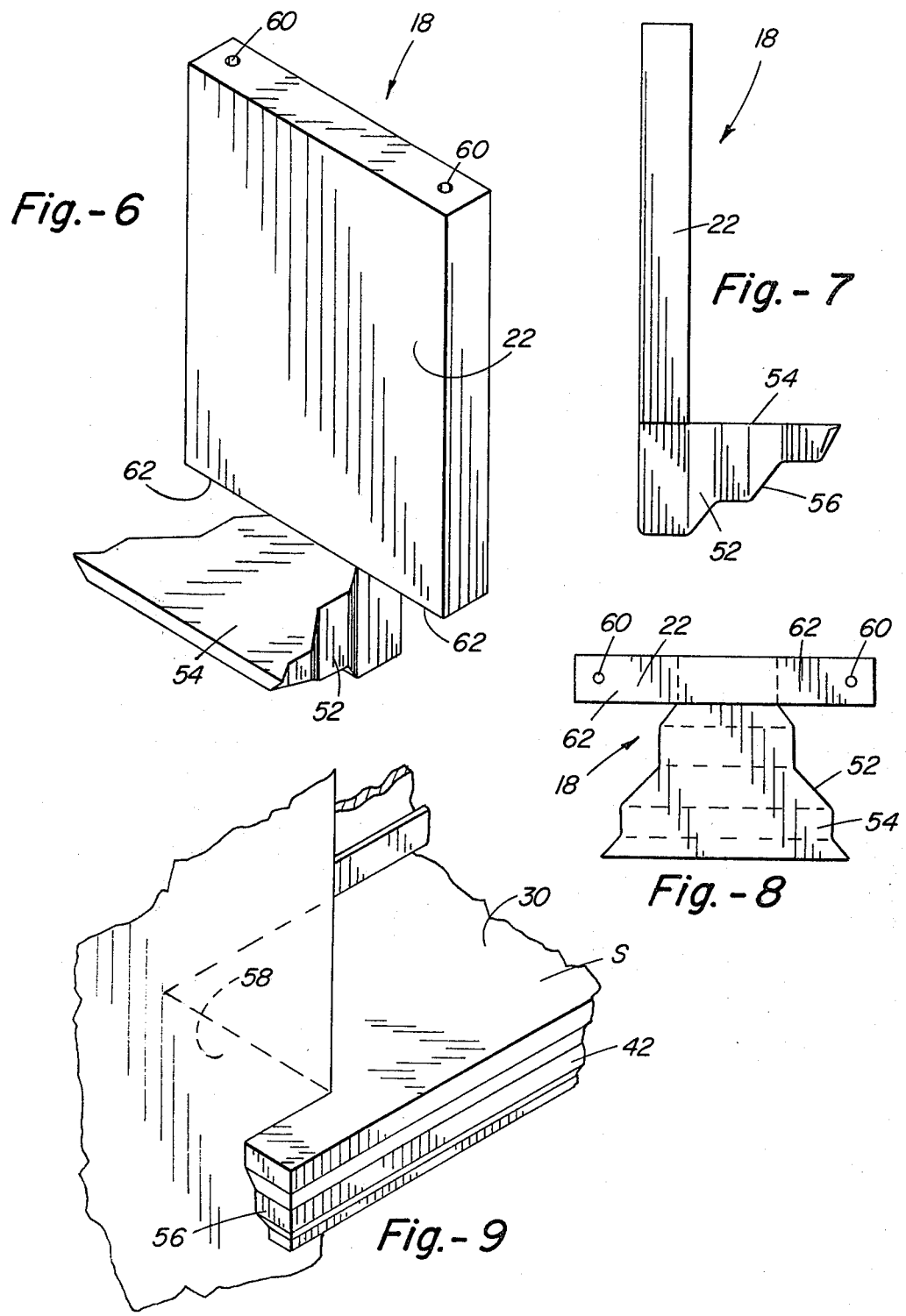

METHOD AND APPARATUS FOR MOLDING PLASTIC WINDOW SILLS

Window sills are, for the most part, cast from ceramic materials at considerable expense, mostly in terms of labor costs. Natural stone and marble sills are, of course, also used; however, only in the most costly of residences and the like where luxurious appointments are affordable. A need exists for an inexpensive sill which resembles the ceramic ones, is equally as serviceable and can be manufactured economically in various lengths with a variety of decorative face flange features. While applicant is unaware of any specific attempts by others at molding a sill from a moldable plastic composition, undoubtedly someone somewhere has tried to do so. The resulting sill, if in fact one of marketable quality was ever made, has failed to receive wide acceptance in the marketplace; at least to applicant's knowledge, it is not now available.

The reasons for this, perhaps, lie in the difficulties associated with molding such a product so as to produce a surface finish of uniform color and one free of air bubbles and other surface imperfections while, at the same time, possessing the necessary resistance to outside forces such as spillage, abuse, changes in temperature and adverse weather. Applicant discovered, as undoubtedly others did before him, that these criteria were most difficult to achieve and maintain in a molded plastic sill. For example, his attempts at pouring the plastic composition into the mold was a total failure in that unsightly voids resulted which not only detracted aesthetically from the finished product and rendered it virtually unsaleable, but, in addition, ruined it structurally.

In addition to the technique required to produce a merchantable product of good quality, applicant discovered that the mold or, more precisely, the pouring form itself became a major stumbling block in that permanent molds of machined stock were prohibitively expensive especially when a different one was needed for each of the many different lengths of sills to say nothing of their face flange decor.

After considerable experimentation using various techniques and different pouring forms, applicant, at long last, discovered that by using a vented form and force-feeding the plastic mix into the portion of the form remote from the vent, the plastic would, in fact, sweep the trapped air ahead thereof and out through the vents thus filling the mold cavity completely and leaving no voids, air bubbles or other surface imperfections in the finished product. It was only when a dam was formed of the mix extending the full length of the mold along the entrance thereto and then advanced progressively toward the remote margin where the vents were located by steadily introducing additional mix therebehind that the aforesaid air-entrapment problems could be avoided. It was necessary to pump the mix into the mold at a pressure sufficient to advance the dam thus formed all the way to the remote end of the pouring form cavity for the process above described to work.

The pouring form, of course, had to have an opening at the entrance thereto which would accommodate introduction of the mix under pressure, the formation of the dam and the pushing thereof down the vertical leg and acrosss the foot to the remote edge or "toe" thereof where the vents are located that allow the trapped air to escape.

Other unique features of the mold lie in the use of a heavy duty generally J-shaped main frame which defines a rigid base and supporting structure for a removable insert having the flange thereof that shapes the face flange of the sill in different configurations. The portion of the pouring form that shapes the inside of the sill which will rest atop the 2×4 wooden sill support remains the same in all sill configurations and it, therefore, can be a part of the main frame. As a matter of fact, in the preferred embodiment, it is hinged to the free edge of the upturned flange on the front edge of the U-shaped part so as to open up and admit the shaped insert. As it is returned to closed position against a spacer and secured, it cooperates with the aforementioned upturned flange to engage and hold a forwardly-extending lip at the toe of the insert while cooperating therewith to produce the required air vents. By making the main frame with a T-shaped base as opposed to a U-shaped one and providing both remote margins of the crossbar with hinged elements like those just described, a double-faced form results in which the sills can be molded two-at-a-time.

Adjustble end plugs cooperate with one another in longitudinally-spaced paired relation to seal the ends of the form as well as to define the length of the finished sill which they function to shape. The upstanding leg of these plugs also functions as a spacer to hold the L-shaped element of the main frame in spaced relation to the upstanding flange or stem portion of the J or T so as to leave the entrance to the pouring form open to receive the mix pumped therein.

It is, therefore, the principal object of the present invention to provide a novel and improved pouring form of a type specifically adapted for the molding of window sills of varying lengths and face configurations.

A second objective is to provide a novel method of introducing the wet mix into the pouring form so as to sweep the trapped air ahead thereof and leave a finished sill free of bubbles, voids and other surface imperfections.

Another object is to provide a device of the type aforementioned which includes a permanent base form and interchangeable inserts for use in the case form that change the surface ornamentation applied to the face flange of the sill.

Still another objective of the within described invention is to produce a vented pouring form, the vents being so arranged and sized that air can escape therefrom but the mix out of which the sill is cast cannot.

An additional object is to provide a sill molding method that accommodates a wide variety of plastic-based sill mixes including those containing solid particulate material of a size that can be pumped through the entrance to the pouring form.

Further objects are to provide a pouring form for window sills that is simple, relatively inexpensive, easy to use and clean, versatile, rugged, lightweight, compact and even somewhat decorative.

Other objects will be in part apparent and in part pointed out specifically hereinafter in connection with the description of the drawings that follows, and in which:

FIG. 1 is a fragmentary perspective view of the pouring form containing a finished sill preparatory to being stripped therefrom, portions of which have been broken away and shown in section both to conserve space and to more clearly reveal the interior construction;

FIG. 2 is a transverse section to a larger scale taken along line 2—2 of FIG. 1;

FIG. 3 is a fragmentary perspective view similar to FIG. 1 and to the same scale showing the main form in open position with the interchangeable insert in place therein;

FIG. 4 is another fragmentary perspective like FIGS. 1 and 3 and to the same scale but differing from FIG. 3 in that the end plugs have been shown in place within the open form;

FIG. 5 is still another perspective view like those of FIGS. 1, 3 and 4 to the same scale and showing the completed pouring form in closed position ready to be injected with mix;

FIG. 6 is a greatly enlarged perspective view showing a double-edged plug of the type that would be used in the form to shape the ends of adjacent sills cast in end-to-end relation on the same side of a single pouring form;

FIG. 7 is an edge view of the plug of FIG. 6 to a slightly smaller scale;

FIG. 8 is a top plan view of the same plug shown in FIGS. 6 and 7 but to the same reduced scale as FIG. 7; and, FIG. 9 is a perspective view to the same scale as FIG. 6 showing how the finished sill cast in the pouring form shown in the preceding figures integrates into the finished wall underneath the inside lower margin of a window frame.

Referring next to the drawings for a detailed description of the present invention and, initially, to FIGS. 1–5 for this purpose, reference letter F has been chosen to broadly designate the pouring form while numerals 10, 12, 14, 16 and 18 have been selected to identify components thereof. More specifically, reference numeral 10 broadly refers to what will be denominated here as the "main frame" that, in turn, has two prime components, one being the more or less stationary bed 12 while the other is the foldable wing thereof 14 which, in the particular form illustrated, is hingedly connected to the bed in a manner and for a purpose which will be set forth in detail presently. An interchangeable insert 16 actually cooperates with wing 14 when in the closed position of FIGS. 1 and 5 to produce the molded article S. Pairs of shaped plugs 18 close the ends of the mold cavity 20 so as to define the length of the finished sill S while, at the same time, contouring the ends thereof as shown in FIG. 9. The upstanding portion 22 of these same plugs 18 functions as a spacer to keep the upstanding flanges 24 and 26, respectively, of the wing and insert spaced apart far enough to define an entrance 28 for the mix to enter that is the same width as the ultimate thickness of the shelf portion 30 of the sill S.

Next, looking at the form F piece-by-piece and starting with the bed 12 of the main frame 10 which is most clearly revealed in FIG. 3, it will be seen in the particular form shown to have an inverted generally T-shaped cross section with the crossbar portion 32 of the T being channel-shaped so as to provide a web 34 bounded on both edges by upstanding flanges 36. Midway between flanges 36 stands flange 38 that defines the stem portion of the inverted T. Flange 38 is, of course, permanently attached to web 34 as shown.

Now, the reason for the inverted T-shaped base 12 of the main frame 10 is to provide a double form in which two sills S can be fabricated at a time in back-to-back relation. Such a configuration has obvious advantages from a practical standpoint although no patentable novelty can be predicated thereon. It is worthy of note, therefore, that a single form would have a base 12 with a J-shaped cross section instead of an inverted T-shaped one and when the term "J-shaped" is used herein, it is intended to refer to only half of the form illustrated.

The function of the bed 12 is basically that of providing a rigid support for one or more of the inserts 16 which actually shape the exterior exposed surfaces of the sill S, no portion of the bed actually coming into contact therewith. Wing 14, on the other hand, has a generally L-shaped cross section and its function is that of shaping the inside or hidden surfaces of the sill which it does, in fact, contact and shape. Wing 14 is revealed in FIGS. 1, 2, 4 and 5 to which detailed reference will next be made.

Its upstanding flange 24 shapes the underside of the sill shelf 30 while its horizontally-disposed flange 40 shapes the backside of decorative face flange 42 seen in FIG. 9. Since the hidden surfaces of the sill S on the underside of shelf 30 and the back of decorative face flange 42 remain the same in all but specially designed sills, wing 14 can, and preferably is, made an integral part of the main frame such as by hinging it thereto with a piano-type hinge 44. Flange 40 of wing 14 is connected to flange 36 of the channel so as to leave a narrow gap 46 therebetween for the lip 48 of the insert 16. In the open position of the wing shown in FIG. 2, the lip 48 of insert flange 50 rests atop the edge of channel flange 36 as shown. However, when the wing 16 is swung closed as shown in FIGS. 1, 2 and 5, it becomes operative to pinch the lip between opposed surfaces of flanges 36 and 40 thereby securely fastening the insert in place within the main frame. Wing 16 can, of course, be merely clamped in place without using the hinged connection 44 but the arrangement shown is preferred.

When closed as previously described, wing flange 40 and channel flange 36 cooperate with one another and with hinge 44 if used to define vents along gap 46 effective to allow air to escape from within cavity 20 while, at the same time, retaining the fluid mix of which the sill S is cast. This is an important feature since, unless such venting is provided for at the remote edge of the mold from where the mix is introduced under pressure, voids will surely result rendering the sill S unacceptable.

The horizontally-disposed flange 50 of insert 18 shapes the front face 42 of the sill as shown in FIG. 9, whereas, the sides 52 of the base 54 of plugs 18 produce the same contour on the exposed ends 56 of the sill, one such end having been shown in FIG. 9 while the base of the plug is revealed in FIGS. 6, 7 and 8. The underside 56 of plug 18 (FIG. 7) is properly shaped to complement flange 50 of the insert cooperating therewith and with flange 40 of the wing resting atop thereof to keep the sill mix from running out the ends of the pouring form where the decorative face flange 42 is being formed. Upstanding flange 22 of the plug 18 cooperates in a similar manner with upstanding flanges 24 and 26 of the wing and insert, respectively, which mate therewith in face-to-face relation to seal the ends of the form where shelf 30 of the sill S is being cast. Flange 22 overhangs the decorative edge 52 of the base 54 of the plug thus forming the inset 58 in the sill that fits the corner of the window opening as seen in FIG. 9. Vertically-extending vent holes 60 are provided in the upstanding flanges 22 of the plugs that open underneath the latter and alongside base 54. As the mix rises up underneath the overhang 62 of flange 22, it can trap air and form bubbles and voids unless vented as shown.

The plugs 18 illustrated in FIGS. 6, 7 and 8 are double-edged so that they can be used to contour adjacent ends of two sills poured in end-to-end relation on the same side of one of the pouring forms. While this is nothing more than a practical feature having no patentable significance it is, nonetheless, quite wothwhile. All shaped contours of the sill (42 and 56) are, of course, formed by the sides 52 of plug base 54 and horizontal flange 50 of the insert 16. These surfaces, therefore, are all that need be changed to produce different contours in the sill, all other surfaces thereof, both exposed and hidden, being essentially plane and planar.

In FIG. 1, a conventional C-clamp 64 has been shown holding the wing 14 closed against the upstanding flange 22 of the plug 18. In versions of the form (not shown) in which the wing is not hingedly attached to the bedframe, additional clamps are needed to hook over upturned edge 66 along the remote edge of flange 40 so as to hold the latter down firmly atop insert 16 while the mix is pumped therein.

The method used in forming the sill S is to pump the wet mix under pressure into the opening 20 in the top of the form F between plugs 18. The material is distributed evenly all along the form so as to sweep the trapped air ahead thereof on out through vents provided by gap 46 and hinge 44. The only other areas that need to be vented are beneath the overhangs 62 of the upstanding flange 22 of plugs 18 where vent holes 60 are provided. Once the form is full and all the trapped air has been vented, any excess mix is troweled off the top edge to form a square face at the rear end of the shelf 40. After the sill S has set, the form can be opened by loosening clamp 64 and swinging wing 14 open as shown in FIG. 2.

Moldable plastic compositions of the type suitable for use in applicant's mold and in accordance with his method of using same are widely available commercially and well known to anyone having an even rudimentary knowledge of the plastic molding art. By and large, they belong to the class of so-called "thermosetting" plastics which, when suitably catalyzed, are exothermic and thus generate the heat required to make them set up after being poured. A suitable moldable plastic composition is not so much finding one that will work since there are many such compositions, but rather, one that is inexpensive enough to use in the large quantities required to make a sill while, at the same time, possessing the desired decorative aspects. Wear-resistance; resistance to sun, weather and stains; and other physical characteristics, present no problem since most all of the thermosetting compositions in one form or another possess these attributes.

What is claimed is:

1. The improved method of forming a cast sill having a shelf bordered along the front edge and at the ends by a decorative face flange using a pouring form having a base, a generally J-shaped insert having a trough at the bottom thereof resting atop the base, combination end plugs and spacers arranged in longitudinally-spaced relation within the trough, and an L-shaped lid cooperating with the insert and plugs when placed atop thereof to define a mold cavity having a pour opening in the top and an air vent remote from said pour opening which comprises the steps of: force-feeding a hardenable plastic mix in fluid form through the pour opening under pressure, using the mix thus introduced to sweep the air within the mold cavity ahead thereof and out of the vent, filling the mold cavity, allowing the fluid mix to set, and stripping the mold from the hardened sill thus cast.

2. The improved method as set forth in claim 1 which includes the step of trimming the excess mix from the pour opening so as to provide a uniform edge at the rear of the shelf before it hardens.

3. The improved pouring form for casting window sills of the type having a horizontally-disposed shelf bordered along the front edge by a decorative face flange which comprises: a horizontally-disposed web having short and long upstanding flanges extending along opposite longitudinal edges thereof cooperating therewith and with one another to define a generally J-shaped rigid trough-like bedframe; a generally J-shaped insert having an upstanding flange and a decorative flange at the base of the latter, said upstanding flange being adapted to rest against and be supported by the long flange of the bedframe when placed in face-to-face relation thereagainst, and said decorative flange with the upstanding flange so positioned, being sized to cover the trough in the bottom of the bedframe while resting upon the short flange thereof; an elongate member having a generally L-shaped cross section defined by mutually perpendicular flanges, one of said perpendicular flanges cooperating with the decorative insert flange when laid atop thereof to define a mold cavity shaped to produce the face flange of the sill, the other of said perpendicular flanges cooperating with the upstanding insert flange when spaced therefrom to define a mold cavity shaped to produce the shelf of the sill atop the face flange thereof, and said one perpendicular flange and decorative flange cooperating with one another to produce a longitudinally-extending vent for the escape of air trapped in the aforesaid cavities; a pair of plug-forming spacers arrangeable in longitudinally-spaced relation between the insert and L-shaped member cooperating therewith and with one another to plug the ends of the mold cavities while holding the said one insert flange and decorative flange in fixed spaced relation and defining a pour opening therebetween remote from said vents; and, hinge means hingedly interconnecting the said one perpendicular flange of the L-shaped element to the short flange of the bedframe, said L-shaped element thus defining a foldable wing movable from an open position adapted to admit the insert and a closed position retaining the latter.

4. The improved pouring form as set forth in claim 1 wherein: the said one perpendicular flange of the L-shaped element and the short flange of the bedframe cooperate in assembled relation to grip the decorative flange of the insert therebetween.

5. The improved pouring form as set forth in claim 1 wherein: opposed portions of the plug-forming spacers are shaped to form the ends of the face flange to the same contour as the front thereof.

6. The improved pouring form as set forth in claim 1 wherein: the plug-forming spacers include an upstanding portion for positioning between the said one perpendicular flange of the L-shaped element and the upstanding flange of the insert, and a base shaped to fill the void between the said other flange of the L-shaped element and decorative insert flange, said upstanding portions overhanging said base portions to produce inwardly-offset portions on the edges of the sill.

7. The improved pouring form as set forth in claim 1 wherein: the hinge means holds the said one perpendicular flange of the L-shapedelement in spaced relation to the short flange so as to define a gap therebetween sized to receive and retain the decorative flange of the insert.

8. The improved pouring form as set forth in claim 6 wherein: the overhanging part of the upstanding portion includes a vent communicating the cavity therebeneath.

* * * * *